United States Patent [19]

Schliephack

[11] Patent Number: 5,445,457

[45] Date of Patent: Aug. 29, 1995

[54] ELECTRICALLY INSULATED SELF ADJUSTING BEARING

[75] Inventor: Christian Schliephack, Coppenbrugge, Germany

[73] Assignee: Renk Aktiengesellschaft, Augsburg, Germany

[21] Appl. No.: 349,140

[22] Filed: Dec. 5, 1994

Related U.S. Application Data

[63] Continuation of Ser. No. 63,441, May 18, 1993, abandoned.

[30] Foreign Application Priority Data

May 18, 1992 [DE] Germany ............... 42 16 408.7

[51] Int. Cl.$^6$ ................................. F16C 17/12
[52] U.S. Cl. ......................................... 384/277
[58] Field of Search ............... 384/277, 432, 434, 380, 384/398

[56] References Cited

U.S. PATENT DOCUMENTS

| | | | |
|---|---|---|---|
| 1,998,888 | 4/1935 | Wallgren | 384/277 |
| 2,011,493 | 8/1935 | Larsh . | |
| 2,476,728 | 7/1949 | Heim . | |
| 4,109,978 | 8/1978 | Ernst et al. | 384/277 |
| 4,844,627 | 7/1989 | Speakman . | |

FOREIGN PATENT DOCUMENTS

| | | |
|---|---|---|
| 2266822 | 10/1975 | France . |
| 2484573 | 12/1981 | France . |
| 759881 | 9/1939 | Germany . |
| 1105727 | 4/1961 | Germany . |
| 1575613 | 5/1970 | Germany . |
| 2245913 | 4/1974 | Germany . |
| 2528890 | 6/1982 | Germany . |
| 56-109918 | 11/1981 | Japan . |
| 2235022 | 2/1991 | United Kingdom . |
| 385099 | 8/1973 | U.S.S.R. . |

OTHER PUBLICATIONS

"Konstruktion 38, 1986, No. 11, pp. 433–441, Sautter, S., von Menz: Modern Sliding Bearings—State of the Art and Development Trends" (no date).

*Primary Examiner*—Lenard A. Footland
*Attorney, Agent, or Firm*—Natter & Natter

[57] ABSTRACT

A self adjusting bearing includes a load bearing having a cylindrical bore for carrying a rotating shaft. The load bearing is mounted for pivoting about an axis which is transverse to and intersects a longitudinal axis of the bore. The load bearing is supported by a pair of housings each of which carries a pivot bearing. A journal projecting radially from the load bearing engages the pivot bearing and an electrically insulating bushing is positioned between the housing and the pivot bearing to electrically isolate the main bearing from the housing. In an alternate embodiment, the insulating bushing is positioned between the load bearing journal and the pivot bushing so that the pivot bushing is also electrically isolated from the load bearing.

9 Claims, 3 Drawing Sheets

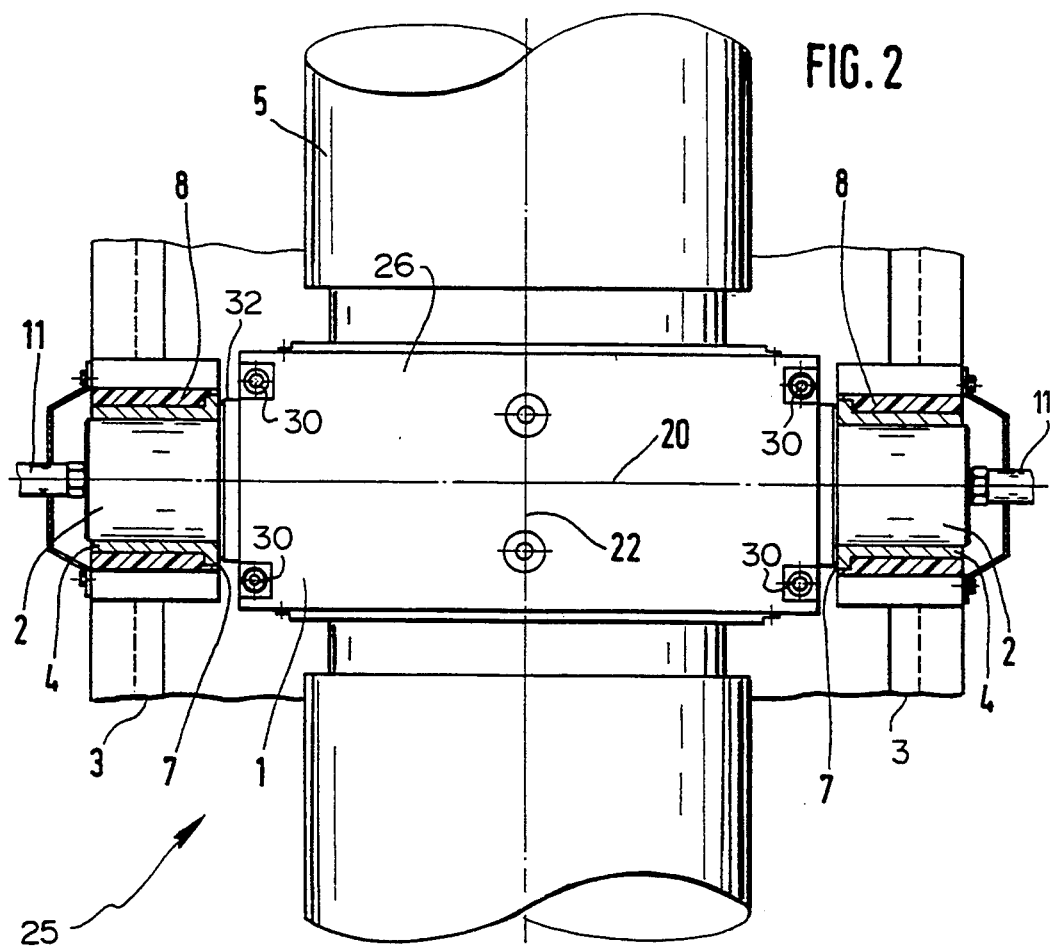
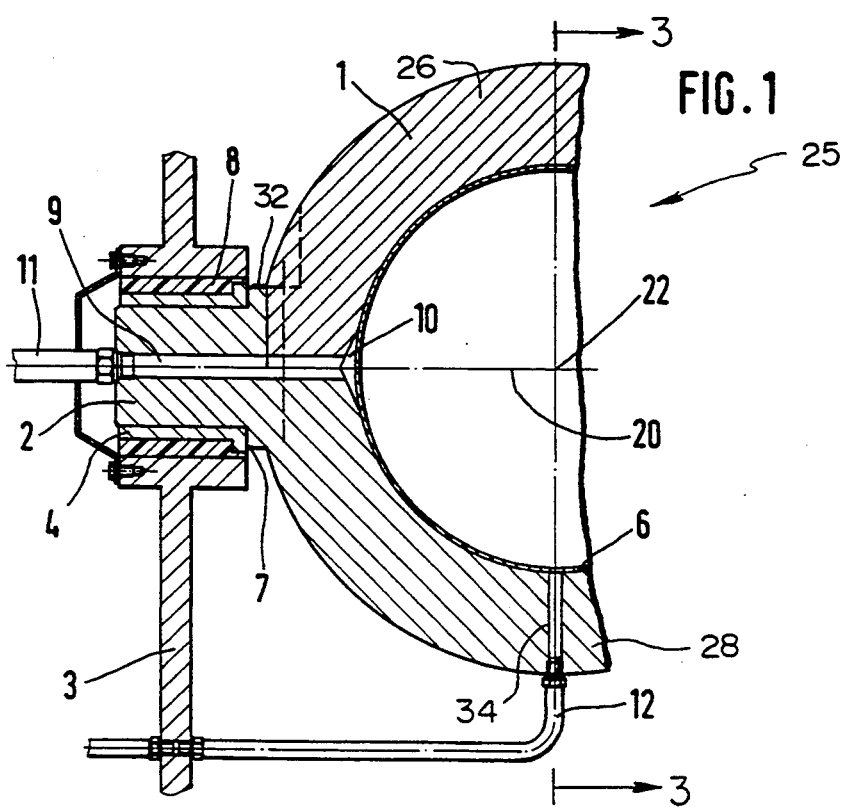

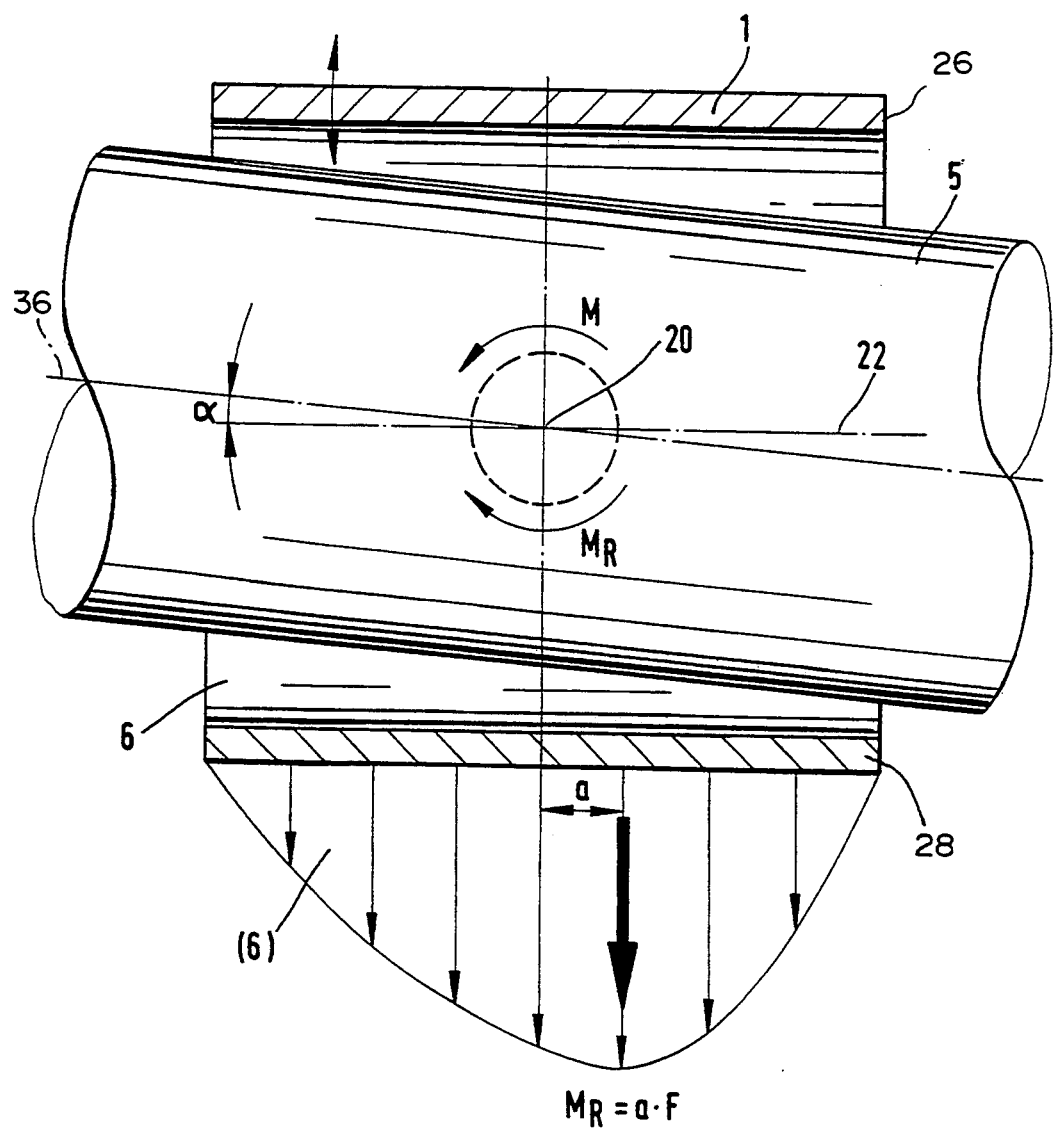

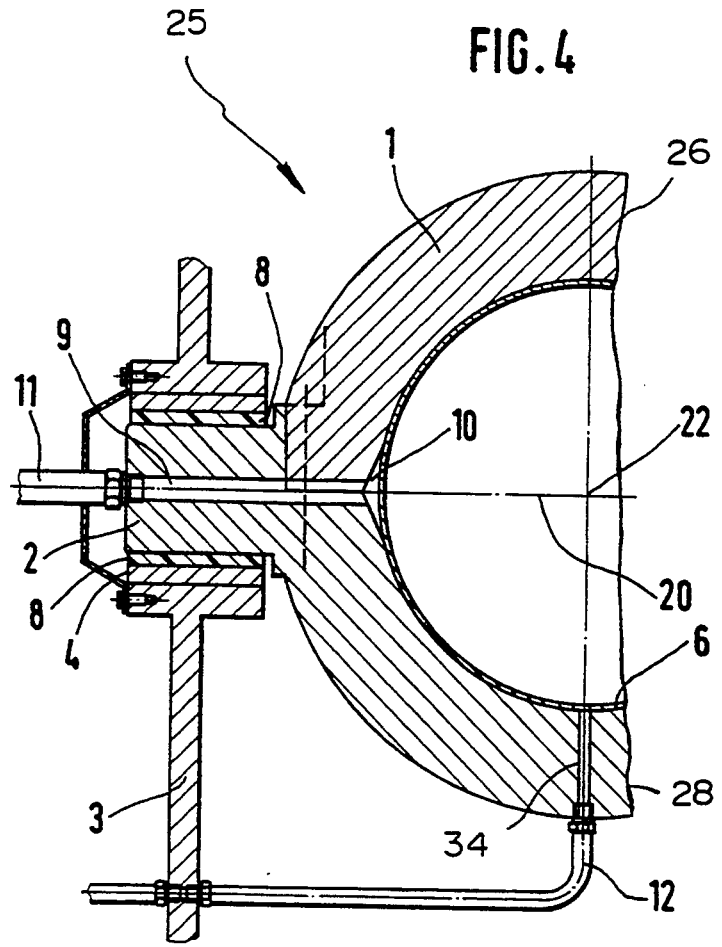

ELECTRICALLY INSULATED SELF ADJUSTING BEARING

This application is a continuation of application Ser. No. 08/063,441, filed May 18, 1993, abandoned.

BACKGROUND OF THE INVENTION

1. Field of the Invention

This invention relates generally to bearings and more particularly to an adjustable bearing capable of accommodating deflections of a rotating shaft and which electrically isolates the shaft from a supporting surface.

2. Related History

In the context of rotating shafts, bearings have been employed as a carrier about which the shafts rotate. Particular problems have been encountered in connection with bearings wherein the application requirements necessitated supporting rotating shafts which were subject to axis deflections.

Environments wherein rotating shafts were subject to vibrations induced variations in the angle of inclination of the rotating shaft axes. Bearings which included tilt segments which were able to adjust for radial and axial shaft deflections have been suggested. Among the disadvantages of prior self adjusting bearings were the following:

(a) Many optimized segments were capable of permitting rotation in only one direction;
(b) Some bearing configurations were complicated, required numerous parts, were costly and servicing was difficult and time consuming;
(c) The load capacities were relatively small per unit of bearing area;
(d) In bearing applications requiring lubrication, a relatively high volume of oil flow was required;
(e) In bearing applications requiring lubrication, relatively complex hydrostatic systems were necessary to simultaneously lubricate several segments; and
(f) In applications requiring electrical isolation of a rotating shaft, insulation was placed between the bearing support and the support surface with such insulation being unreliable and with the shaft being subject to grounding by inadvertent contact with the bearing support.

SUMMARY OF THE INVENTION

In compendium, the invention comprises an electrically insulated self adjusting bearing assembly including a load bearing having a cylindrical bore for carrying a rotating shaft. The load bearing is mounted for pivoting about a transverse axis which perpendicularly intersects a longitudinal axis of the bearing bore.

A pair of transverse bearing support housings each carry a pivot bearing and a bushing which electrically isolates the load bearing from the support housings.

From the foregoing compendium, it will be appreciated that it is an aspect of the present invention to provide a self adjusting bearing of the general character described which is not subject to the disadvantages of the related history aforementioned.

A consideration of the present invention is to provide a self adjusting bearing of the general character described which is relatively low in cost and suitable for economic mass production fabrication.

To provide a self adjusting bearing of the general character described which is capable of lubricating a rotating shaft subject to deflections with a relatively simple oil delivery system is yet another aspect of the present invention.

Yet another consideration of the present invention is to provide a self adjusting bearing of the general character described with relatively few parts and which is simple to maintain and repair.

A feature of the present invention is to provide a self adjusting bearing of the general character described wherein a rotating shaft and a load bearing carrying the shaft are electrically isolated from support housings is a still further aspect of the present invention.

With these ends in view the invention finds embodiment in various combinations of elements, arrangements of parts and series of steps by which the above mentioned aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings in which are shown some of the possible exemplary embodiments of the invention, FIG. 1 is a transverse fragmentary sectional view through a self adjusting bearing assembly constructed in accordance with and embodying the invention and showing a load bearing carrying a rotating shaft (not shown in section), the load bearing having a transverse pivot journal carried in a pivot bearing which is, mounted in a support housing;

FIG. 2 is a fragmentary plan view of the shaft and the self adjusting bearing assembly and the rotating shaft with portions broken to show the pivot bearings and a pair of insulating bushings in section;

FIG. 3 is a fragmentary schematized longitudinal sectional view through the self adjusting bearing assembly, the same being taken substantially along the plane 3—3 of FIG. 1 and including a graph illustrating the forces and moments acting upon the bearing when the longitudinal axis of the rotating shaft deflects; and FIG. 4 is a transverse sectional view through an alternate embodiment of the self adjusting bearing assembly wherein insulating bushings and pivot bearings rotate relative to a support housing.

DESCRIPTION OF THE PREFERRED EMBODIMENTS

Referring now in detail to the drawings, the reference numeral 25 denotes generally a self adjusting bearing assembly constructed in accordance with and embodying the invention. The bearing assembly 25 comprises a load bearing 1 having a transverse bore configured to carry a rotating shaft 5. The load bearing 1 is constructed of a bearing cap 26 and a bearing base 28 which are secured together by a plurality of fasteners 30. A cylindrical bore is provided through the load bearing 1 with the bore having a longitudinal axis 22. The diameter of the bore is slightly larger than that of the rotating shaft 5 to provide a lubricating gap 6 for lubrication of the bearing 1 in a manner to be subsequently described.

In accordance with the invention, the load bearing 1 is mounted for pivoting about a transverse axis 20 which intersects the longitudinal axis 22 of its cylindrical bore. For such purpose, the load bearing 1 includes a pair of transverse journals 2 which project from opposite sides of the bearing and which are coaxial with the transverse axis 20. Each transverse journal 2 is received within a transverse support housing 3.

The support housing 3 includes a bore which is coaxial with the transverse axis 20. Within the housing bore is a pivot bearing 4 in contact with the journal 2. Spaced between the pivot bearing 4 and the bore of the housing 3 is an electrically insulating cylindrical bushing 8.

In order to preclude lateral movement along the transverse axis 20, the pivot bearing 4 includes a shoulder 7 which abuts against a mating shoulder 32 of enlarged radius formed on the journal 2. It should be noted that the radius of the shoulder 7 is less than that of the bore of the support housing 3 so that the bushing 8 at all times maintains an insulating barrier between the load bearing 1 and the support housing 3.

It will be appreciated that the rotating shaft 5, together with the load bearing 1 will be capable of tilting about the pivot axis 20 and thus be capable of movements in an axial and radial direction. The pivot bearings 4 may be self lubricating or may be provided with a hydrostatic lift through the employment of a supply of pressurized oil directed into a lubricating gap between the inner surface of the pivot bearing 4 and the journal 2.

It should also be realized that with the insulating bushing 8 electrically isolating the shaft and the load bearing 1 from the support housing 3, a simple, reliable and durable electrically insulating construction is provided which ensures that inadvertent contact with the support housings will not ground or otherwise defeat the intended electrical isolation of the shaft 5.

Oil required for the lubrication gap interface 6 between the rotating shaft 5 and the bore of the load bearing 1 is supplied from a pressure source (not shown) along the pivot axis 20 through a pair of electrically insulating flexible tubes 11 each of which is coupled to a bore 9 extending axially through each journal 2 and radially into the cylindrical bore of the load bearing 1. The bore 9 includes an outwardly flared radially inner end 10 to facilitate oil distribution within the lubricating gap 6, as illustrated in FIG. 1.

A further flexible electrically insulating lubricating oil supply line 12 is coupled to a lower region of the lubricating gap 6 through a bore 34 which extends radially upwardly through the bearing base 28.

Referring now to FIG. 3, when a longitudinal axis 36 of the shaft 5 is shown deviating from the longitudinal axis 22 of the bore of the load bearing 1 by an angle alpha, the friction moment M of the transverse journals 2 and their mating pivot bearings 4 must be smaller than the restoring moment $M_R$ which results from the pressure distribution in the lubricating gap 6 between the rotating shaft 5 and the inner cylindrical bore. Because of the differential moment, the load bearing 1 rotates about the transverse pivot axis 20 for self adjustment such that the axes 22, 33 are coincident and engagement between the inner wall of the cylindrical bore of the load bearing 1 with the shaft 5 is avoided. In FIG. 3, there is illustrated a graph of the forces and moments acting upon the bearing assembly 25. It should be noted that the letter "F" denotes the resulting force from the pressure distribution in the lubricating gap 6 and the letter "a" represents the leverage fulcrum or pivot axis 20 and the resultant force F.

In the embodiment of FIGS. 1 and 2, the bushings 8 are positioned between the bore of the support housing 3 and the pivot bearings 4. In an alternate configuration the bushings 8 may be positioned between the journals 2 and the pivot bearings 4.

Referring now in greater detail to FIG. 4, wherein like numerals are employed to denote like components of the previous embodiment, it should be noted that a load bearing is disclosed of substantially identical construction to that previously described.

The self adjusting bearing assembly differs, however, in that a cylindrical electrically insulating bushing 8 is positioned around and in contact with each transverse journal 2. Positioned between the outer surface of each bushing 8 and a bore of a cylindrical support housing 3, is a pivot bearing 4. The pivot bearing 4 and its support housing 3 are thus electrically insulated from the load bearing 1 and a shaft 5.

In this configuration, the load bearing 1, transverse journal 2, bushing 8 and pivot bearing 4 rotate jointly as a unit relative to the support housing 3. In all other aspects, the embodiment of FIG. 4 is identical to that of the embodiment previously described.

Thus it will be seen that there is provided a self adjusting bearing which achieves the various aspects, features and considerations of the present invention and which is well suited to meet the conditions of practical usage.

Since various possible embodiments might be made of the present invention and various changes might be made in the exemplary embodiments set forth herein without departing from the spirit of the invention, it is to be understood that all matter shown and described in the accompanying drawings is to be interpreted illustrative and not in a limiting sense.

Having thus described the invention there is claimed as new and desired to be secured by Letters Patent:

1. An electrically insulated self adjusting bearing assembly comprising a bearing having a bearing cap, a bearing base and a cylindrical bore extending through the cap and the base, the cylindrical bore having a bore axis, the bearing being configured for carrying a rotating shaft having a shaft axis and for withstanding torque and heat loads generated by the shaft, a pair of means for supporting the bearing and means for accommodating deviations between the bearing axis and the shaft axis, the means for accommodating deviations between the bearing axis and the shaft axis including means interconnecting each supporting means and the bearing, the interconnecting means being positioned remote from the shaft and the bearing and elevated temperatures resulting from the heat loads, the interconnecting means including means permitting movement between the bearing axis and the supporting means about a pivot axis, the pivot axis intersecting and being transverse to the bearing axis, the means for accommodating deviations between the bearing axis and the shaft axis further including a pivot bearing carried in each supporting means and a pair of journal means, each journal means projecting from the bearing, each journal means being coaxial with the pivot axis, each pivot bearing being coaxial with the pivot axis, the bearing assembly further including means for electrically isolating the bearing from the supporting means, the isolating means comprising a cylindrical insulating bushing registered with the journal means and coaxial with the pivot axis, the cylindrical insulating bushing being positioned between the pivot bearing and the supporting means the pivot bearing being subject only to pivot torque loads, whereby the cylindrical insulating bushing may be formed of material incapable of withstanding elevated temperatures.

2. An electrically insulated self adjusting bearing assembly as constructed in accordance with claim wherein a lubrication gap is provided between the cylindrical bore and the rotating shaft, the bearing assembly further comprising means for introducing a pressurized lubricant into the lubrication gap.

3. An electrically insulated self adjusting bearing assembly as constructed in accordance with claim 2 wherein the means for introducing a pressurized lubricant into the lubrication gap comprises a lubrication bore extending radially through the bearing from the cylindrical bore, the lubrication bore extending through the bearing base.

4. A self adjusting bearing assembly for compensating for variations in the position of the longitudinal axis of a rotating shaft as constructed in accordance with claim 2 wherein the means for introducing pressurized lubricant into the lubrication gap comprises a lubrication bore extending radially through the bearing from the cylindrical bore, the lubrication bore being coaxial with the pivot axis.

5. An electrically insulated self adjusting bearing assembly for compensating for variations in the position of the longitudinal axis of a rotating shaft, the bearing assembly comprising a bearing having a cylindrical bore for accommodating the rotating shaft and means remote from the bore and the rotating shaft for pivotally mounting the bearing for rotation about a pivot axis perpendicular to and intersecting the longitudinal axis of the bearing, the assembly further including a bearing support, the means pivotally mounting the bearing for rotation about the pivot axis including a pivot bearing carried in the bearing support and a journal projecting from the bearing, the rotating shaft having a diameter less than that of the cylindrical bore whereby a lubrication gap is provided between the cylindrical bore and the rotating shaft, the bearing assembly further comprising means for introducing a pressurized lubricant into the lubrication gap, the means for introducing pressurized lubricant into the lubrication gap comprising a lubrication bore extending radially through the journal to the cylindrical bore, the lubrication bore being coaxial with the pivot axis, the assembly further including means for electrically insulating the bearing from the bearing support, the means for electrically insulating comprising a substantially cylindrical insulating bushing positioned between the journal and the bearing support, the pivot bearing, the journal and the insulating bushing being coaxial with the pivot axis, the cylindrical insulating bushing being positioned remote from the cylindrical bore and the rotating shaft and being subject only to pivot torque loads whereby the bushing may be formed of material incapable of withstanding elevated temperatures.

6. An electrically insulated self adjusting bearing assembly for compensating for variations in the position of the longitudinal axis of a rotating shaft as constructed in accordance with claim 5 wherein the cylindrical insulating bushing is positioned between the pivot bearing and the bearing support.

7. An electrically insulated self adjusting bearing assembly for compensating for variations in the position of the longitudinal axis of a rotating shaft as constructed in accordance with claim 5 wherein the journal is seated within the pivot bearing, the journal including a transverse radially outwardly projecting shoulder proximate the bearing, the pivot bearing including an end shoulder engageable with the journal shoulder for precluding lateral movement of the bearing along the pivot axis, the insulating bushing having a maximum diameter greater than the maximum diameter of the journal shoulder and being positioned between the pivot bearing and the bearing support whereby the bearing and rotating shaft are electrically isolated from the bearing support.

8. An electrically insulated self adjusting bearing assembly for compensating for variations in the position of the longitudinal axis of a rotating shaft as constructed in accordance with claim 7 wherein the insulating bushing includes an annular enlarged diameter step proximate the bearing, the shoulder of the pivot bearing being seated in the annular step.

9. An electrically insulated self adjusting bearing assembly comprising a bearing having an axis, the bearing being configured with a cylindrical bore for carrying a rotating shaft having an axis, means for supporting the bearing and means for accommodating deviations between the bearing axis and the shaft axis, the means for accommodating deviations between the bearing axis and the shaft axis including means interconnecting the bearing and the supporting means, the interconnecting means including means for permitting movement between the bearing axis and the supporting means about a pivot axis, the pivot axis being transverse to the bearing axis, the means for accommodating deviations between the bearing axis and the shaft axis including a pivot bearing carried in the supporting means and journal means, the journal means projecting from the bearing, the journal means being coaxial with the pivot axis, the pivot bearing being coaxial with the pivot axis, the bearing assembly further comprising means for electrically isolating the bearing from the supporting means, the isolating means comprising a bushing, the bushing being positioned between the pivot bearing and the supporting means, the bushing being coaxial with the pivot axis and being positioned at a location remote from the cylindrical bore, the rotating shaft and heat generated by rotation of the shaft within the bore whereby the bushing may be fabricated of an insulating material incapable of withstanding elevated temperatures.

* * * * *